Figure 5:
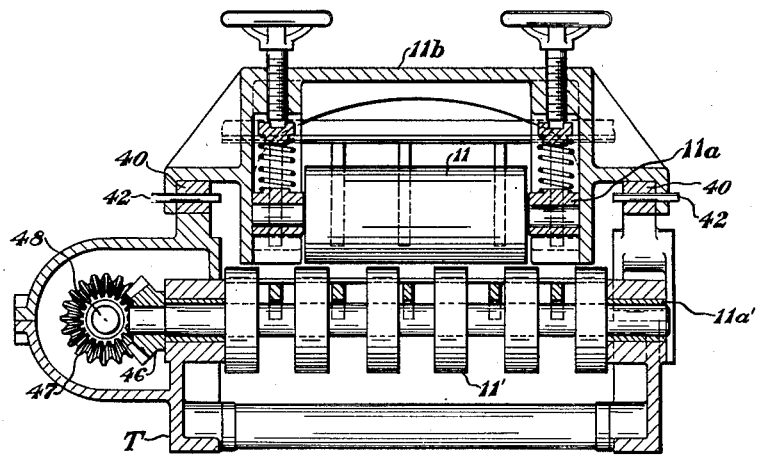

Dec. 9, 1930.  A. J. TOWNSEND ET AL  1,784,556
AUTOMATIC SHEARS
Filed April 6, 1927  5 Sheets-Sheet 1
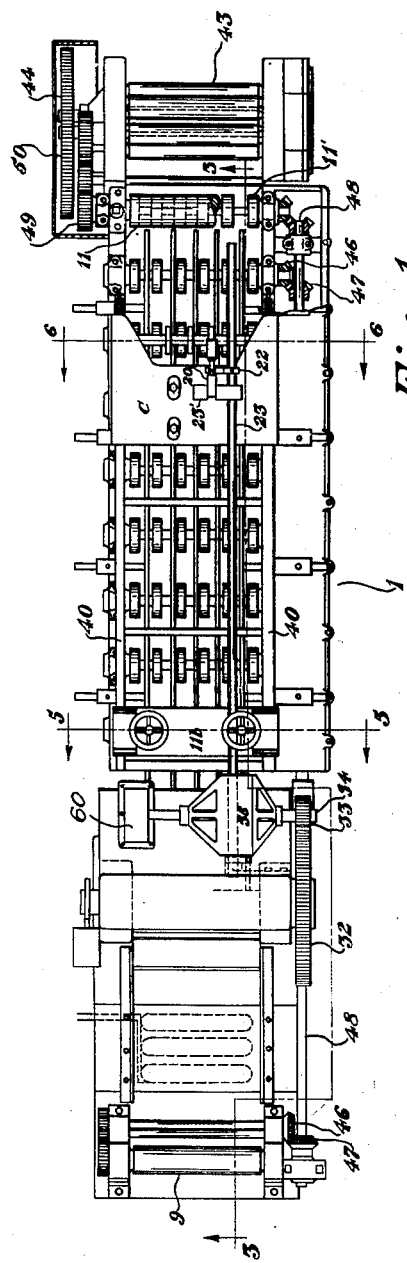
Inventors
A. J. Townsend
E. S. Miller
By Freast and Bond Attorneys

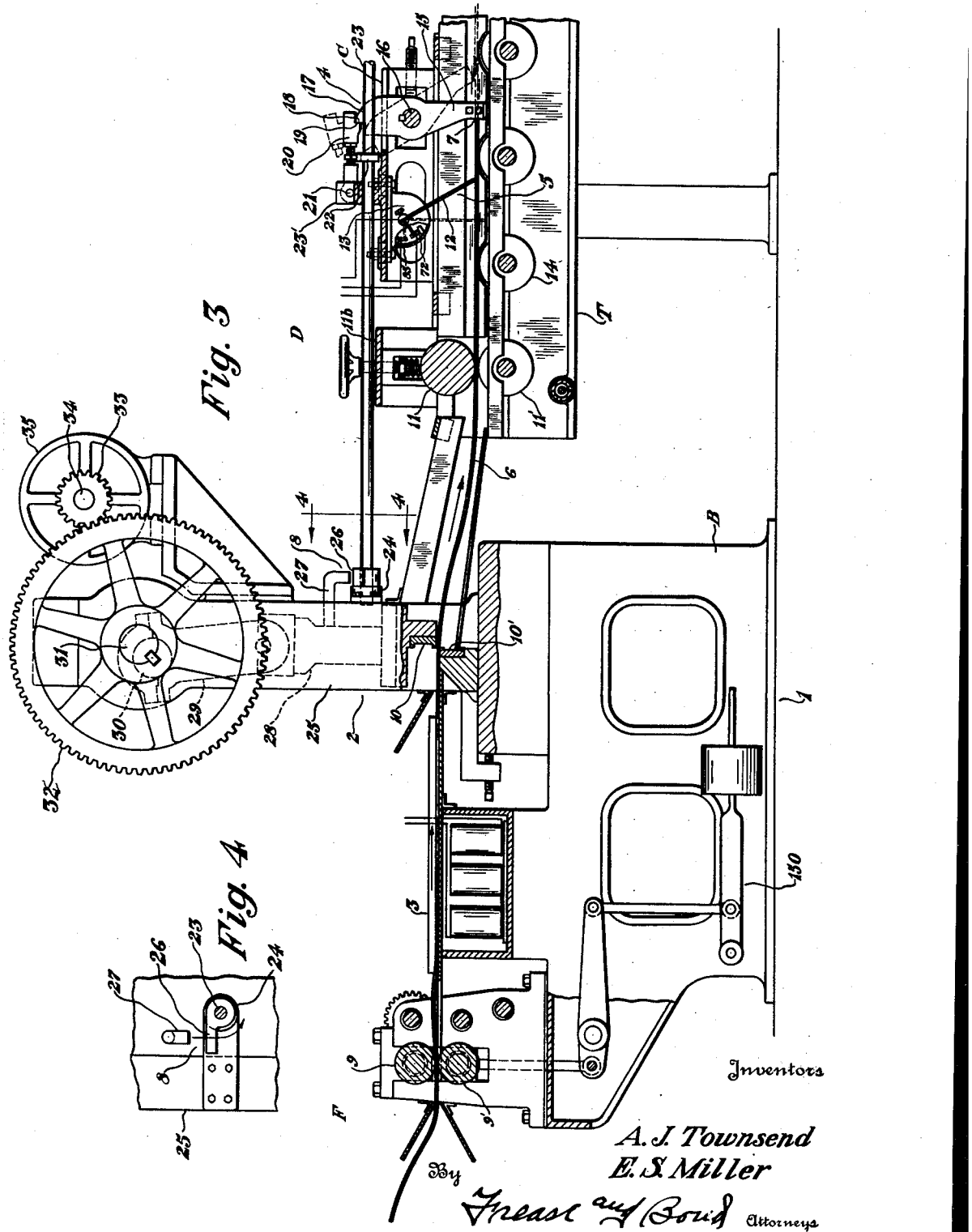

Dec. 9, 1930.  A. J. TOWNSEND ET AL  1,784,556
AUTOMATIC SHEARS
Filed April 6, 1927   5 Sheets-Sheet 5

Inventors
A. J. Townsend
E. S. Miller
By Frease and Bond  Attorneys

Patented Dec. 9, 1930

1,784,556

UNITED STATES PATENT OFFICE

ARTHUR J. TOWNSEND, OF CANTON, AND EDWARD S. MILLER, OF ELYRIA, OHIO, ASSIGNORS, BY MESNE ASSIGNMENTS, TO THE AMERICAN ROLLING MILL COMPANY, OF MIDDLETOWN, OHIO, A CORPORATION OF OHIO

AUTOMATIC SHEARS

Application filed April 6, 1927. Serial No. 181,410.

The invention relates to automatic shears for shearing strip sheets and the like from a continuous strip, and more particularly from a continuous strip continuously fed from a strip rolling mill or the like into automatic shears mounted on a stationary base.

The requirements and specifications of the trade demand that the sheared ends of strip sheets shall be straight and true; and furthermore the specifications tolerate only definite variations in the separate lengths of the separate strip sheets in a series, all of which have been ordered to be the same length.

If a moving strip is fed into any shears mounted on a stationary base, unless the strip is brought to rest on both sides of the shears during the shearing operation thereof, a ragged uneven cut will be made.

Accordingly, the principal objects of the present improvements are to provide automatic shears mounted on a stationary base for shearing sheets from strips and the like, including strip arresting means and stop means for instantaneously bringing the strip to rest on both sides of the shears during the shearing operation thereof, and automatic means actuated by the moving strip for cooperatively actuating the strip arresting means and shears, whereby a series of strip sheets having a predetermined length tolerance may be successively sheared from a continuous strip continuously fed into the automatic shears.

These and ancillary objects are attained by a construction and arrangement hereinafter set forth in detail and which may be stated in general terms as including shearing means, strip arresting means and stop means for bringing a moving strip instantaneously to rest on both sides of the shears during the shearing operation thereof, control means for the strip arresting means and the shearing means, said control means being actuated by the moving strip and adapted to slow down the speed of the same, and the stop means comprising positive mechanical means for positively stopping the forward end of the moving strip after the strip arresting means and shear control means have been actuated thereby, and means actuated by the shearing means for releasing the positive mechanical stop means after the strip sheet has been sheared from the strip.

Figure 6:
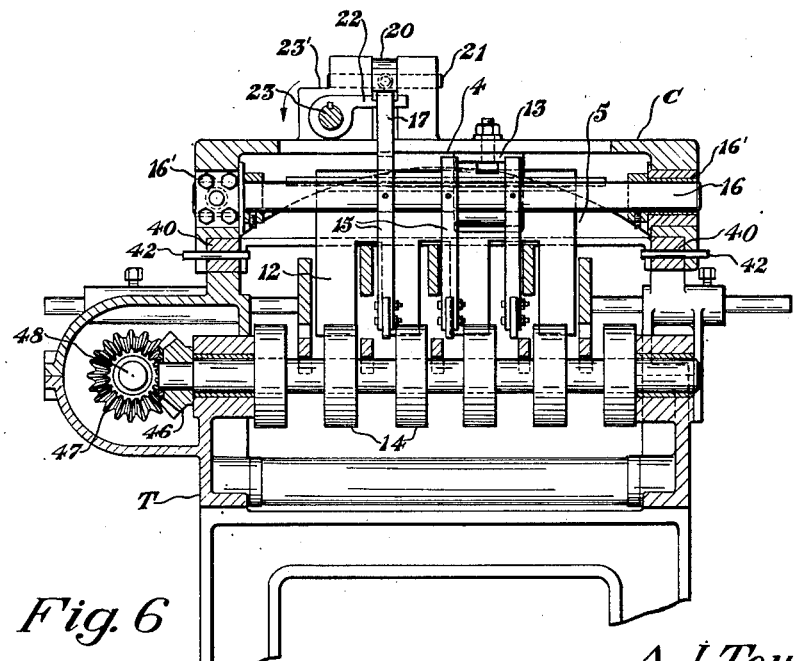
Figure 7:
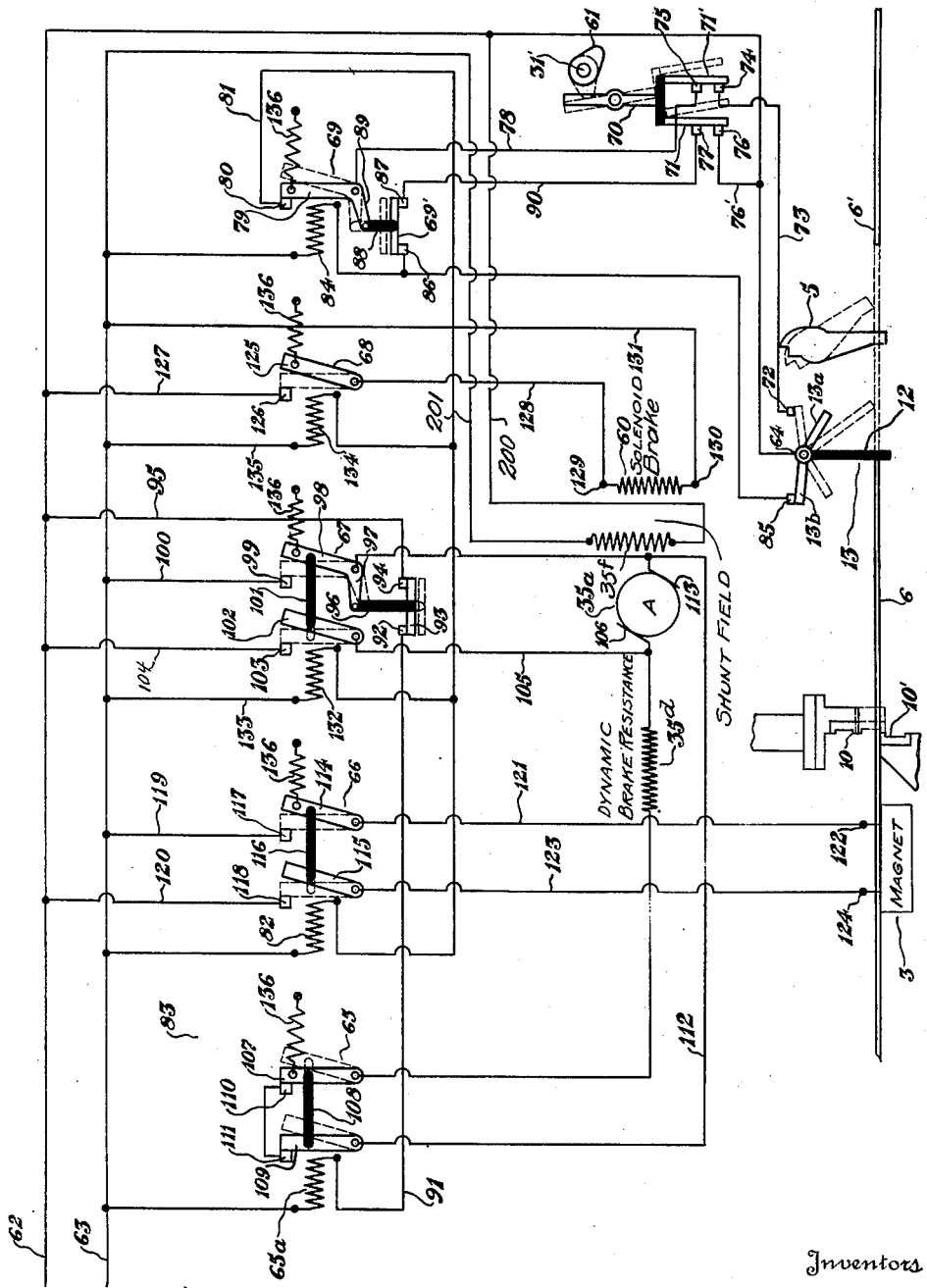
Figure 8:
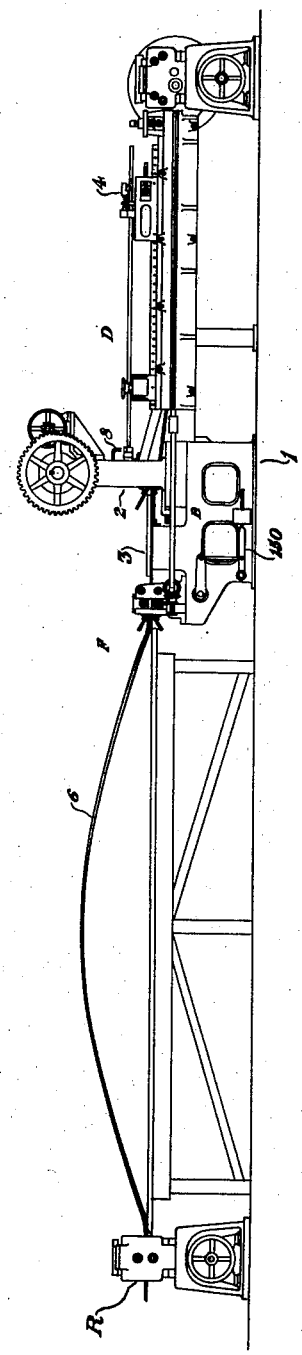

A preferred embodiment of the invention is illustrated in the accompanying drawings forming part hereof, in which Figure 1 is a top plan view of the improved automatic shears;

Fig. 2, a side elevation thereof;

Fig. 3, an enlarged fragmentary longitudinal vertical sectional view thereof, as on line 3—3, Fig. 1;

Fig. 4, a fragmentary sectional view thereof, as on line 4—4, Fig. 3, illustrating the releasing means for the positive mechanical stop;

Fig. 5, an enlarged fragmentary transverse cross sectional view of the automatic shears as on line 5—5, Figs. 1 and 2;

Fig. 6, an enlarged fragmentary transverse cross sectional view thereof, as on line 6—6, Figs. 1 and 2;

Fig. 7, a diagrammatic view illustrating the electrical wiring of the automatic operation of the improved shears; and Fig. 8, a side elevation of the improved automatic shears and preferred strip feeding means therefor.

Similar numerals refer to similar parts throughout the several views.

The improved automatic shears indicated generally at 1 includes shearing means indicated generally at 2, and mounted on a stationary base B, strip arresting means indicated generally at 3 at one side of the shearing means, and adjustable strip stop means indicated generally at 4 at the other side of the shearing means, electrical control means for the strip arresting means and the shearing means, hereinafter to be described in detail, said control means being actuated as at 5 by a moving strip 6 fed through the automatic shears by suitable feeding means and being preferably adapted for slowing down the moving strip before it strikes the stop means, and the stop means comprising positive mechanical means for positively stopping the forward end 7 of the strip 6 after the strip arresting means and shear control means have been actuated by the strip, and means indicated generally at 8 and actuated by the shearing means for releasing the positive mechanical stop means after a strip sheet has been sheared from the strip.

Certain of the aforesaid means comprising the automatic shears are provided with necessary or desirable adjustments, and all of the means are mechanically and/or electrically cooperatively and coactively combined with each other for providing automatic operation for the shears, as will be hereinafter set forth in detail.

The strip 6, which may be a continuous strip continuously fed from and by the last stand of rolls R of a strip rolling mill or the like, into the automatic shears may first be passed through pinch or friction rolls 9 and 9' suitably and operatively mounted at the strip feed side F of the shears, and the strip then passes over the strip arresting means 3 likewise at the strip feed side of the shears, and the strip arresting means being preferably electro-magnetic means adapted to be energized and de-energized by the automatic operation of the machine for instantaneously arresting and holding the portion of the strip 6 on the strip feed side of the machine during the shearing operation of the shearing means 2.

The strip 6 passes from the arresting means 3 between the upper raised movable knife 10 and the lower stationary knife 10' of the shearing means, and through adjustable delivery rolls 11 and 11' mounted for rotation in suitable bearings 11a and 11a' preferably carried in a bridge 11b longitudinally adjustable on a table T at the delivery side D of the machine, and the forward end 7 of the strip strikes the depending swinging combined switch and strip slow down arms 12 which actuate the electrical switch 13, which switch controls the shearing operation of the shearing means 2, that is, the raising and lowering of the upper shear knife 10, and which switch also controls the energizing and de-energizing of the electro-magnetic strip arresting means 3. The arms 12 are of such weight that they likewise act as slow-down or decelerating means for reducing the speed of the moving strip before it strikes the mechanical stop means.

The forward end 7 of the strip striking against the arm 12 swings it from the vertical position indicated in dotted lines, to the inclined position indicated in full lines, in Fig. 3, thereby closing a circuit hereinafter to be described in detail and causing the raised shear knife 10 to start to move downward towards the stationary shear knife 10', and energizing the electro-magnetic strip arresting means 3.

During the necessary time interval for energizing the magnetic strip arresting means, and for starting the knife 10 to move downward, the strip 6 is fed along by the delivery rolls 11 and 11', and conveyor rolls 14 operatively mounted in the table T beyond the gripping delivery rolls 11 and 11', until substantially simultaneously with the complete energizing of the magnetic strip arresting means 3, the forward end 7 of the strip strikes against and is positively stopped by the depending swinging stop arms 15 of the mechanical stop means 4, mounted for oscillation upon a horizontal stop arm shaft 16, carried in suitable bearings 16' preferably mounted in a stop carriage C longitudinally adjustable on the table, and extending crosswise of the longitudinal axis of the machine and above the sheets, and one of the stop arms being provided with an upwardly extending latch arm 17 which, when the upper knife 10 is raised above a certain level, has a latch tongue 18 abutting against a notch 19 at the lower outer corner of a latch catch arm 20 mounted on the carriage for oscillation upon a catch arm shaft 21 parallel with the shaft 16.

The catch arm 20 is adapted to be swung upward about its shaft 21 by means of a catch arm elevating lever 22 laterally extending beneath the catch arm 20, and mounted for oscillation with a lever shaft 23 slidably mounted at one end in a bearing 23' on the carriage, and having its other end longitudinally extending into and secured for oscillation in a bearing 24 upon the shear frame 25.

Adjacent the frame 25, a lever shaft oscillating finger 26 is secured upon the shaft and extends in a direction opposite to the elevating lever 22, the finger being adapted to be swung downward, thereby turning the shaft 23 in the direction indicated by the arrow in Fig. 4, by a reciprocating finger actuating nose 27 secured upon the reciprocating shear head 28 to which the upper knife 10 is secured, the reciprocating shear head being pivotally connected in a well known manner by a link 29 with an eccentric 30 on the crank shaft 31 of the shears 2.

A gear wheel 32 is keyed upon the drive shaft 31 and is meshed with a drive pinion 33 on the shaft 34 of a motor 35, whereby operation of the motor serves to raise and lower the knife 10 of the shears 2, in a well known manner.

When the nose 27 descends and strikes and swings the finger 26 downward, the catch arm 20 is swung upward, thereby releasing the latch tongue 18 from its abutment against the notch 19 at the lower outer corner of the catch arm 20, permitting the stop arms 15 to be swung to the position indicated in the dotted lines in Fig. 3, by the strip sheet which has now been sheared from the strip by the downward movement of the upper knife 10 across the lower knife 10', and which strip sheet is carried away from the shears by the successive sets of driven conveyor rolls 14.

It is necessary to provide the mechanical stop arms 15 for positively stopping the forward end 7 of the moving strip 6 substantially simultaneously with the energizing of the electro-magnetic arresting means 3, because if the electro-magnetic arresting means were alone depended upon to stop the moving sheet during the operation of the shears, the inertia of the moving sheet, and, when fed from a rolling mill, the constant push thereof, would cause slippage over the electro-magnetic arresting means, and also because there would be a tendency for the gripping delivery rolls 11 and 11' and the conveyor rolls 14 to cause a buckling or distortion of the partially sheared strip sheet during the shearing operation. The positive stop arms furthermore enable successive strip sheets to be accurately sheared within a specified length tolerance.

The table T is preferably provided with spaced longitudinally extending guide rails 40 each preferably provided with a plurality of spaced horizontally extending apertures 41, and the bridge 11b and the carriage C are preferably longitudinally slidable on the rails 40, and each provided with one or more removable pins 42 which may be extended through suitable apertures therein and into one or more of the apertures 41 in the rails in order to adjust and fix the longitudinal position of the bridge and/or the carriage on the table for accommodating strip sheets of different lengths.

A final set of gripping delivery rolls 11 and 11' may be mounted for rotation in the table for delivering the strip sheets sheared by the operation of the machine, preferably into a set of leveling rolls 43 which may be driven through suitable gearing 44 by a motor 45.

Convenient means of driving the pinch rolls 9 and 9', the gripping delivery rolls 11 and 11' and the conveyor rolls 14 consists of providing the several cross-wise extending shafts of the same with bevel gears 46 meshing with suitable bevel gears 47 keyed upon a suitably mounted shaft 48 extending longitudinally alongside of the machine, which longitudinal shaft may be driven as by means of a flat gear 49 upon one of the cross-wise extending roll shafts, and connected by a suitable gear train 50 with the motor 45.

Preferred means of effecting a coordinated automatic coaction between the several parts of the automatic shears, are illustrated diagrammatically in Fig. 7, and which includes the electro-magnetic strip arresting means 3, the upper reciprocating knife 10 and the lower stationary knife 10' of the shearing means, the control switch 13, the mechanical stop 5 and the moving strip 6.

The electrical control switch 13 controls the operation of the arresting means 3, the shearing means 2, and the stop means 4; and the switch 13 includes an auxiliary reset switch which prevents any further reciprocation of the upper knife 10 of the shearing means after it has sheared a strip sheet 6' from the strip 6, until the sheared strip sheet 6' has passed out of contact with the switch actuating arm 12 of the switch 13.

In the diagram in Fig. 7, the field of the shearing means motor 35 is indicated at 35f and the armature of the motor 35, is indicated at 35a.

For facilitating the attainment of intermittent and successive single reciprocations of the upper knife 10 from a raised position at rest once down and across the stationary knife 10' and back to the raised position at rest, an electro-magnetic actuated brake on the motor shaft indicated at 60 is provided for the motor, and a trip cam 61 is connected as upon an end 31' of the crank shaft 31 of the shears 2, and the trip cam 61 is adapted for making a single rotation with each single rotation of the crank shaft and consequently with each complete reciprocation of the upper knife 10 as aforesaid. In addition to the electro-magnetic actuated brake 60, a resistance 35d is provided for causing an electro-dynamic braking of the motor in a manner to be later described.

Electrical power may be secured for actuating the electro-magnetic arrester 3, the armature 35a of the motor 35, and the brake 60, from a power line which may include a conductor 62 and a conductor 63.

The control switch 13 preferably includes a control conductor arm 13a and a reset conductor arm 13b electrically connected with each other at a central junction 64 which may be the terminal of the power conductor 62.

For switching in and out electric power from the conductors 62 and 63 to the various electrically actuated parts of the apparatus, a double contact electro-magnetic actuated automatic switch indicated generally at 65 may be provided for the electro-dynamic brake resistance 35d, a similar automatic switch 66 may be provided for the arrester 3, and a modified automatic switch 67 may be provided for the armature 35a and for the electro-magnetic actuating means 65a of the switch 65.

For the electro-magnetic or solenoid brake 60, a single contact electro-magnetic switch 68 is provided; and for controlling the actuation of the switches 66, 67, and 68, a modified single contact automatic switch 69 is provided and includes an auxiliary bridge switch conductor 69' for cooperation with the reset switch arm 13b; whereas operation of all of the aforesaid switches is controlled by the switch 13 and an oscillating double arm lever switch 70 adapted to be oscillated by rotation of the trip cam 61 and having switch arms 71 and 71' each adapted to make and break a circuit between two contacts as hereinafter set forth.

The switch 13 is provided with a contact 72 for connection and disconnection with the oscillating control conductor arm 13a, and a conductor 73 connects the contact 72 with the contact 74 of the oscillating switch 70 which is likewise provided with a contact 75 connectable and disconnectable with the contact 74 by the arm 71', and with contacts 76 and 77 connectable and disconnectable by the arm 71.

The contact 76 is connected by a conductor 76' with the conductor 62; the contact 75 is connected by a conductor 78 with the oscillating conductor arm 79 of the switch 69, and the arm 79 is adapted for making and breaking connection with a contact 80 of the switch 69.

A conductor 81 connects the contact 80 through the electro-magnetic actuator 82 of the switch 66 with the power conductor 63, and the power conductor 63 is connected through the electro-magnetic actuator 84 of the switch 69 with the reset contact 85 of the switch 13.

The switch 69 is provided with a reset contact 86 connected to the conductor 63 and with a reset contact 87 and the contacts 86 and 87 are adapted to be connected and disconnected by the bridge conductor 69' arranged to be raised from connection with and lowered into connection with the contacts 86 and 87 as by means of a non-conducting link 88 pivotally connected with an oscillating actuating lever 89 extending opposite from the conductor arm 79 and oscillatable therewith, whereby when the conductor arm 79 makes connection between the conductor 78 and the contact 80, the bridge conductor 69' makes connection between the reset contacts 86 and 87, and vice versa.

The reset contact 87 is connected by a conductor 90 with the contact 77 of the oscillating switch 70.

The electro-magnetic actuator 65a of the switch 65 is in series with a conductor 91 connecting the power conductor 63 with an auxiliary contact 92 of the switch 67 and this auxiliary contact 92 may be connected and disconnected by a raising and lowering bridge conductor 93 of the switch 67 with an auxiliary contact 94 thereof which is connected by a conductor 95 with the power conductor 62.

The bridge conductor 93 of the switch 67 may be raised and lowered by a link 96 pivotally connected with an actuator arm 97 arranged to be oscillated with one of the oscillating conductor arms 98 of the switch 67, whereby when the conductor arm 98 is oscillated to connect with the contact 99, the bridge conductor 93 is lowered to break connection between the contacts 92 and 94, and vice versa.

The contact 99 of the switch 67 is connected by a conductor 100 with the power conductor 63. The oscillating conductor arm 98 of the switch 67 is connected as by a non-conductor link 101 with another oscillating conductor arm 102 adapted to make and break connection with the contact 103, whereby the arms 98 and 102 may make and break simultaneous connection respectively with the contact 99 and 103.

The contact 103 is connected by a conductor 104 with the power conductor 62. The arm 102 is connected by a conductor 105 with one of the armature brushes 106 of the motor and through the electro-dynamic resistance 35d therefor with one of the oscillating conductor arms 107 of the switch 65.

The oscillating arm 107 is connected as by a non-conductor link 108 for oscillation with the other oscillating conductor arm 109 of the switch 65, whereby the arms 107 and 109 are adapted to make or break simultaneous connection with the connected contacts 110 and 111 of the switch 65.

The arm 109 of the switch 65 is connected by a conductor 112 with the other armature brush 113 of the motor, and with the arm 98 of the switch 67.

The switch 66 includes oscillating arms 114 and 115 connected with each other as by a non-conducting link 116 and arranged to oscillate with each other for simultaneously making and breaking connection, respectively, with contacts 117 and 118, the contact 117 being connected by a conductor 119 with the power conductor 63 and the contact 118 being connected by a conductor 120 with the power conductor 62.

The conductor arm 114 is connected by a conductor 121 with one terminal 122 of the electro-magnetic arrester 3; and the conductor arm 115 is connected by a conductor 123 with the other terminal 124 of the arrester 3.

The switch 68 includes an oscillating conductor arm 125 arranged to make and break connection with the contact 126 of the switch, and the contact 126 is connected by a conductor 127 with the power conductor 62; and the conductor arm 125 is connected by a conductor 128 with one terminal 129 of the electro-magnetic brake 60, the other terminal 130 of which is connected by a conductor 131 with the power conductor 63.

The electro-magnetic actuator 132 of the switch 67 is connected in series with a conductor 133 connecting the power conductor 63 and the conductor 81; and the electro-magnetic actuator 134 of the switch 68 is likewise connected in series with a conductor 135 connecting the conductor 63 with the conductor 81.

An oscillating lever arm of each of the switches 65, 66, 67 and 69 is provided in a usual manner with a spring 136, arranged normally to maintain the oscillating arms disconnected from their respective contacts, and the springs acting against the respective electro-magnetic actuators of the switches, which when energized oscillate the arms to make connection with their respective contacts.

When the various switch arms, the mechanical stop, and the shearing means, are in the position indicated in full lines in Fig. 7, the apparatus is ready to have the electro-magnetic arrester 3, and the shearing means 2 actuated as the result of contact of the forward end 7 of the moving strip 6 against the depending swinging arm 12 of the switch 13.

In the condition illustrated in full lines in Fig. 7, a current may flow from the conductor 62 through the reset arm 13$b$, through the actuator 84, and the power conductor 63, or vice versa; whereby the actuator 84 is energized to hold the conductor arm 79 of the switch 69 in connection with the contact 80, and the bridge conductor 69' in connection with the contacts 86 and 87.

Likewise with the bridge conductor 93 of the switch 67 connecting the contacts 92 and 94 as indicated in full lines, a current may flow from the power conductor 62 through the conductor 95, the bridge conductor 93, the conductor 91 and the actuator 65$a$ into the power conductor 63, or vice versa; whereby the actuator 65$a$ maintains the conductor arms 107 and 109 in connection with the contacts 110 and 111.

When the arm 12 is swung to the position indicated in dotted lines by the moving strip, the conductor arm 13$a$ makes connection with the contact 72, and current may then flow from the power conductor 62 through the arm 13$a$, the conductor 73, the arm 71', the conductor 78, the arm 79, the conductor 81, the actuator 82, and into the power conductor 63, and also from the conductor 81 through the actuator 132 and the conductor 133 into the conductor 63, and also from the conductor 81, through the actuator 134 and the conductor 135 into the conductor 63, or vice versa; whereby the actuators 82, 132 and 134 will be energized to make connection of the respective conductor arms of the several switches with their contacts.

Current also may flow from the conductor 62 through the conductor 76', the conductor arm 71, the conductor 90, the bridge 69', the actuator 84, and into the power conductor 63 whereby the actuator 84 is still energized after connection of the arm 13$b$ with the contact 85 has been broken, and as long as the arm 71 makes connection between the contacts 76 and 77, and the bridge 69', makes connection between the contacts 86 and 87.

The actuators of the switches 66, 67, and 68 having thus been energized, the several conductors arms of the respective switches make connection with their respective contacts, and during the time the forward end of the strip 7 is moving towards the mechanical stop 5, a current may be flowing from the power conductor 62 through the conductor 120, the arm 115, the conductor 123, the electro-magnetic arrester 3, the conductor 121, the arm 114 and the conductor 119 into the conductor 63, or vice versa; whereby the arrester is energized and causes the moving strip 6 to slow down so that it may be positively stopped by the impact of the forward end 7 against the mechanical stop 5 as aforesaid without damage to the forward end 7 of the strip.

Meanwhile the motor 35 has been started by a flow of current through the armature and field thereof, which may be from the conductor 62 through the arm 102, the conductor 105, the brush 106, the armature 35$a$, the brush 113, the arm 98, and the conductor 100 into the power conductor 63, and also from the power conductors 62 and 63 through the conductors 200 and 201 to the shunt field 35$f$; whereby the armature 35$a$ is energized as long as the conductor arms 98 and 102 of the switch 67 make connection with their respective contacts, thus causing the motor to start to rotate and causing the shear crank shaft 31 to rotate for reciprocating the knife 10.

At the time when the actuator 132 oscillates the arms of the switch 67 to close the switch, connection is broken between the contacts 92 and 94, because the bridge conductor 93 is lowered to the position shown in dotted lines, thus stopping the flow of current though the actuator 65$a$, which therefore will only maintain the connection of the arms of the switch 65 with their contacts during the time interval necessary for the actuator 65$a$ to lose its magnetic energy, after which the spring 136 of the switch 65 withdraws the arms thereof from their connection with the contacts, so that the circuit through the electro-dynamic brake resistance 35$d$ is broken. Accordingly, the switches 65 and 67 can never be closed at one time, one of them being closed when the other is opened and vice versa.

The electromagnetic actuated brake 60 provided on the motor shaft may be of any well known spring pressed disk plate type which is normally operative to effect a braking of the motor shaft when no current is passing through its solenoid; and when current passes through the solenoid, the same relieves and releases the pressure between the brake disks so that the brake is inoperative.

Thus, when the switch arm 68 is in the position shown in full lines, the brake 60 is operative to effect a braking of the motor shaft, and when the solenoid of the brake 60 is energized by the switch arm 68 making connection with the contact 126 as aforesaid, current flows from the power conductor 62 through the conductor 127, the arm 68, the conductor 128, the brake 60, and the conductor 131 to the power conductor 63, energizing the brake solenoid and relieving the braking pressure so as to permit a driving torque to be applied to the motor shaft as aforesaid.

The crank shaft 31 of the shears makes one complete rotation, during which rotation the trip cam 61 oscillates the switch 70, and breaks and makes the connections of the arms 71 and 71′ with the contacts 76 and 77, and 74 and 75, respectively, whereby the aforesaid connections between the contacts 76 and 77, and 74 and 75 are broken at a desired point in the upward travel of the reciprocating knife 10, thereby maintaining the energizing of the arrester 3, until the sheared strip sheet 6 has been conveyed away from the shears a suitable distance.

When the connection between the contacts 76 and 77, and 74 and 75 is broken, however, the circuit energizing the switch actuator 84 is broken and the conductor arm 79 of the switch 69 is oscillated by its spring, out of connection with the contact 80 thereby raising the bridge conductor 69 out of connection with the contacts 86 and 87.

At the same time the current flowing through the actuators 82, 102 and 126 is stopped; whereby the springs 136 of the switches 66, 67, and 68 oscillate the conductor blades thereof out of connection with their respective contacts back to the position shown in full lines in Fig. 7, and whereby the actuator 65a is again energized and the arrester 3, the armature 35a, and the solenoid of the brake 60, are de-energized.

At the time when the solenoid of the brake 60 is de-energized, the friction brake disks of the brake engage each other so as to apply a braking effect upon the motor shaft in order to bring the same to rest when the crank shaft 31 of the shears has made one complete rotation, as aforesaid.

Meanwhile, at the time when the switch 67 is opened, the bridge conductor 93 completes the circuit between the contacts 92 and 94 so that current will flow through the actuator 65a to cause the switch 65 to be closed, whereupon the resistance 35d is cut in across the armature 35a so that counter E. M. F. in the armature effects a dynamic braking condition of the motor 35, which assists the electro-magnetic actuated brake 60 in bringing the motor shaft to rest when the knife 10 has completed a single reciprocation.

The conductor arm 79 of the switch 69 having thus been oscillated by its spring to the position shown in the dotted lines in Fig. 7, and its connection with the contact 80 thus broken, and the connection between the contacts 86 and 87 being likewise broken, as the result of the oscillation of the arms 71 and 71′ to break and make connection between the contacts 76 and 77, and 74 and 75, respectively; as long as the sheared strip sheet 6′ maintains the switch arm 12 in the position indicated in the dotted lines in Fig. 7, no current can flow through the actuator 84 of the switch 69 for remaking connection between the conductors thereof with their contacts.

When, however, the rear end of the strip sheet 6′ is conveyed out of contact with the arm 12 the same swings backward to the vertical position indicated in full lines in Fig. 7, and the reset conductor arm 13b again makes connection with the contact 85 permitting re-energizing of the actuator 84, which must be energized for maintaining the conductors of the switch 69 in connection with their respective contacts, and this connection must be made in order to permit operation of the motor and the arrester.

Accordingly a very efficient safety device is thereby provided preventing any reciprocation of the shearing knife 10 until after the arm 12 has resumed a vertical position.

The improved automatic shears described in detail as aforesaid, is very economical in floor space, saving half of the floor space required for a manually operated shearing apparatus having the same capacity.

A manually operated shears which was superseded by an embodiment of the automatic shears of the present invention, required the labor of 7 men to shear 200 tons of material in 24 hours, whereas the automatic shears hereof required the labor of only 2 men to shear 350 tons of similar material in 24 hours.

The use of the automatic shears of the present invention enables the attainment of a length tolerance of $\tfrac{3}{16}$ inch in the separate successive strip sheets sheared by the automatic operation thereof as aforesaid.

In a preferred operation of the apparatus the pinch rolls 9 and 9′ do not tightly grip the strip 6 passing therethrough but are preferably in frictional engagement with the strip 6 permitting some slippage and this frictional engagement may be regulated as by means of a weight and lever system indicated generally at 150.

When the apparatus is arranged as indicated in Fig. 8, with the feeding rolls R, spaced a suitable distance from the arresting means 3, and during the operation of the arresting and stop means, the strip 6, still being continuously fed by the rolls R, may bow upward as illustrated in Fig. 8 storing energy therein, which when the arresting means is de-energized causes the strip 6 to shoot through the separate knives at a speed greater than the speed of the rolls R, whereby the operation of the automatic shears may be adjusted to keep up with the speed of the continuous feed through the rolls R.

We claim:

1. Apparatus for shearing strip sheets from a strip continuously fed to the apparatus, including shearing means, arresting means on one side of the shearing means, stop means on the other side of the shearing means, the arresting means and stop means being adapted for bringing the moving strip to rest on both sides of the shearing means during the shearing operation thereof, control means for the arresting means and the shearing means, release means for the stop means, and means associated with the shearing means for actuating the release means.

2. Apparatus for shearing strip sheets from a strip continuously fed to the apparatus, including shearing means, arresting means on one side of the shearing means, stop means on the other side of the shearing means, the arresting means and stop means being adapted for bringing the moving strip to rest on both sides of the shearing means during the shearing operation thereof, strip slow-down means between the shearing means and the stop means, control means for the arresting means and the shearing means, release means for the stop means, and means associated with the shearing means for actuating the release means.

3. Apparatus for shearing strip sheets from a strip continuously fed to the apparatus, including shearing means, arresting means on one side of the shearing means, stop means on the other side of the shearing means, the arresting means and stop means being adapted for bringing the moving strip to rest on both sides of the shearing means during the shearing operation thereof, combined strip slow-down means and control means for the arresting means and the shearing means, release means for the stop means, and means associated with the shearing means for actuating the release means.

4. Apparatus for shearing strip sheets from a strip continuously fed to the apparatus, including shearing means, means for feeding a moving continuous strip into the shearing means, arresting means on one side of the shearing means, means for positively stopping the forward end of the strip on the other side of the shearing means, the arresting means and stop means being adapted for bringing the moving strip to rest on both sides of the shearing means during the shearing operation thereof.

5. Apparatus for shearing strip sheets from a strip continuously fed to the apparatus, including shearing means, arresting means on one side of the shearing means, means for positively stopping the forward end of the strip on the other side of the shearing means, the arresting means and stop means being adapted for bringing the moving strip to rest on both sides of the shearing means during the shearing operation thereof.

6. Apparatus for shearing strip sheets from a strip continuously fed to the apparatus, including shearing means, arresting means on one side of the shearing means, means for positively stopping the forward end of the strip on the other side of the shearing means, the arresting means and stop means being adapted for bringing the moving strip to rest on both sides of the shearing means during the shearing operation thereof, and means for delivering from the apparatus a strip sheet sheared thereby from the strip.

7. Apparatus for shearing strip sheets from a strip continuously fed to the apparatus, including shearing means, arresting means on one side of the shearing means, means for positively stopping the forward end of the strip on the other side of the shearing means, the arresting means and stop means being adapted for bringing the moving strip to rest on both sides of the shearing means during the shearing operation thereof, and means actuated by the moving strip for controlling the operation of the shearing means, arresting means and stop means.

8. Apparatus for shearing strip sheets from a strip continuously fed to the apparatus, including shearing means, arresting means on one side of the shearing means, means for positively stopping the forward end of the strip on the other side of the shearing means, the arresting means and stop means being adapted for bringing the moving strip to rest on both sides of the shearing means during the shearing operation thereof, means for controlling the operation of the shearing means, arresting means and stop means, said controlling means being actuated by contact with the end of the moving strip to be sheared off by the shearing means as a strip sheet, and means rendering the shearing means inoperative after a strip sheet has been sheared off the strip until contact of the sheared off strip sheet with the controlling means has been broken.

9. A strip shearing apparatus including shearing means, electro-magnetic means for arresting a strip to be sheared, positive mechanical means for stopping the forward end of the strip, and electro-magnetic and mechanical control means coordinating the operation of the shearing means, the electro-magnetic strip arresting means, and the mechanical stop means with each other.

10. A strip shearing apparatus including shearing means, electro-magnetic means for arresting a strip to be sheared, positive mechanical means for stopping the forward end of the strip, and electro-magnetic control means coordinating the operation of the shearing means, the electro-magnetic strip arresting means and mechanical stop means with each other.

11. A strip shearing apparatus including shearing means, electro-magnetic means for arresting a strip to be sheared, positive mechanical means for stopping the forward end of the strip and control means coordinating the operation of the shearing means, the magnetic means, and the mechanical stop means with each other.

12. A strip shearing apparatus including shearing means, magnetic means for arresting a strip to be sheared, mechanical means for positively stopping the forward end of the strip to be sheared, release means for the stop means, and means associated with the shearing means for actuating the release means.

13. A strip shearing apparatus including shearing means, magnetic means for arresting a strip to be sheared, mechanical means for positively stopping the forward end of the strip, and electro-dynamic means for stopping the shearing means after it has completed a shearing operation.

14. Apparatus for shearing strip sheets from continuous strips, and the like, including shearing means, arresting means on one side of the shearing means, means for positively stopping the forward end of the strip on the other side of the shearing means, the arresting means and the stop means being adapted for bringing a moving strip to rest on both sides of the shearing means during the shearing operation thereof, control means for the arresting means of the shearing means, release means for the stop means, means associated with the shearing means for actuating the release means, and electro-dynamic means for stopping the shearing means after it has completed a shearing operation.

ARTHUR J. TOWNSEND.
EDWARD S. MILLER.